US011963272B2

(12) United States Patent
Neudorf et al.

(10) Patent No.: US 11,963,272 B2
(45) Date of Patent: Apr. 16, 2024

(54) DATA ACQUISITION METHODS AND APPARATUS FOR A NETWORK CONNECTED LED DRIVER

(71) Applicant: Mate. LLC, Oklahoma City, OK (US)

(72) Inventors: Jason Neudorf, Calgary (CA); Steven Lyons, Calgary (CA); Kyle Hathaway, Calgary (CA)

( * ) Notice: Subject to any disclaimer, the term of this patent is extended or adjusted under 35 U.S.C. 154(b) by 0 days.

(21) Appl. No.: 18/133,940

(22) Filed: Apr. 12, 2023

(65) Prior Publication Data

US 2023/0254954 A1 Aug. 10, 2023

Related U.S. Application Data

(63) Continuation of application No. 17/706,733, filed on Mar. 29, 2022, now Pat. No. 11,632,832, which is a (Continued)

(51) Int. Cl.

| | |
|---|---|
| ***H05B 45/355*** | (2020.01) |
| ***H05B 45/10*** | (2020.01) |
| ***H05B 45/14*** | (2020.01) |
| ***H05B 45/20*** | (2020.01) |
| ***H05B 45/37*** | (2020.01) |
| ***H05B 45/50*** | (2022.01) |
| ***H05B 47/175*** | (2020.01) |
| ***H05B 47/19*** | (2020.01) |
| ***H05B 47/21*** | (2020.01) |

(52) U.S. Cl.

CPC ............. *H05B 45/10* (2020.01); *H05B 45/14* (2020.01); *H05B 45/20* (2020.01); *H05B 45/355* (2020.01); *H05B 45/37* (2020.01); *H05B 45/50* (2020.01); *H05B 47/175* (2020.01); *H05B 47/22* (2020.01)

(58) Field of Classification Search

None

See application file for complete search history.

(56) References Cited

U.S. PATENT DOCUMENTS 8,299,987 B2 10/2012 Neudorf et al.
8,525,446 B2 9/2013 Tikkanen et al.
(Continued)

FOREIGN PATENT DOCUMENTS

CA 2913239 A1 12/2014
CN 102201958 B 12/2013
(Continued)

OTHER PUBLICATIONS

Canadian Intellectual Property Office, International Search Report for PCT/CA2019/051163, dated Nov. 7, 2019.
(Continued)

*Primary Examiner* — Anh Q Tran
(74) *Attorney, Agent, or Firm* — Young's Patent Services; Bruce A. Young

(57) ABSTRACT

A lighting system including monitoring of input power and output power parameters to a set of lighting loads to detect power faults and/or anomalies. The set of sensing circuits include primary side and secondary side sensing circuits that communicate with a set of monitoring circuits to process the information supplied by the sensing circuits. If a fault and/or anomaly is sensed or detected, a signal is transmitted to provide an alert.

21 Claims, 11 Drawing Sheets

Related U.S. Application Data continuation of application No. 17/270,166, filed as application No. PCT/CA2019/051163 on Aug. 23, 2019, now Pat. No. 11,330,683.

(60) Provisional application No. 62/721,678, filed on Aug. 23, 2018.

(56) References Cited

U.S. PATENT DOCUMENTS

| | | | | |
|---|---|---|---|---|
| 8,926,133 | B2 | 1/2015 | Booth | |
| 8,957,601 | B2 | 2/2015 | Tikkanen et al. | |
| 9,039,230 | B2 | 5/2015 | Crimi et al. | |
| 9,041,379 | B2 | 5/2015 | Lyons | |
| 9,049,759 | B2 | 6/2015 | Tikkanen et al. | |
| 9,078,310 | B2 | 7/2015 | Tikkanen et al. | |
| 9,320,093 | B2 | 4/2016 | Tikkanen et al. | |
| 9,433,053 | B2 | 8/2016 | Neudorf | |
| 9,591,713 | B2 * | 3/2017 | Tikkanen | H05B 45/60 |
| 9,775,207 | B2 | 9/2017 | Tikkanen et al. | |
| 9,942,954 | B2 | 4/2018 | Neudorf et al. | |
| 10,045,421 | B2 | 8/2018 | Tikkanen et al. | |
| 10,076,016 | B2 | 9/2018 | Tikkanen et al. | |
| 10,187,946 | B2 | 1/2019 | Tikkanen et al. | |
| 11,330,683 | B2 | 5/2022 | Neudorf et al. | |
| 11,632,832 | B2 * | 4/2023 | Neudorf | H05B 45/37 315/297 |
| 2011/0204820 | A1 * | 8/2011 | Tikkanen | H05B 45/37 361/709 |
| 2016/0128144 | A1 | 5/2016 | Tikkanen et al. | |
| 2016/0227616 | A1 | 8/2016 | Lee | |
| 2017/0110873 | A1 * | 4/2017 | Glovinski | H02H 3/32 |
| 2017/0127497 | A1 | 5/2017 | Baek et al. | |
| 2017/0332462 | A1 | 11/2017 | Tikkanen | |
| 2018/0116022 | A1 | 4/2018 | Lõrincz et al. | |
| 2020/0068680 | A1 | 2/2020 | Neudorf et al. | |

FOREIGN PATENT DOCUMENTS

| | | | |
|---|---|---|---|
| KR | 20110092100 | A | 8/2011 |
| WO | 2010031169 | A1 | 3/2010 |
| WO | 2020082178 | A1 | 4/2020 |

OTHER PUBLICATIONS

Canadian Intellectual Property Office, Written Opinion of the ISA for PCT/CA2019/051163, dated Nov. 7, 2019.

* cited by examiner

| Data Acquisition Sense Point and Event Table | | |
|---|---|---|
| **Primary Side Sense Point** | **Data snap shot readings** | **Anomaly or Fault Possibilities** |
| PFC Bus Voltage Sense | Out of regulation range- with return to regulation range | Input AC Mains Transient with either a voltage dip and/or a voltage swell |
| | PFC bus voltage decay resulting in converter restart sequence | Input AC Mains Voltage Interruption |
| | | Input AC mains recycled off and back on by end user |
| PFC Gate Drive (On-time) | On-time less than minimum limit with return to nominal range | AC mains input transient with voltage swell greater than predetermined limit |
| DC/DC Converter Primary Current Sense | current greater than 100 % load limit | Light fixture power rating exceeds predetermined power limit on one or more power channels |
| | | output short circuit on one or more power channels |

| Secondary Side Sense Point | Data snap shot readings | Anomaly or Fault Possibilities |
|---|---|---|
| Power Monitor Current Sense | Current sense exceeds predetermined maximum limit with no recovery | Output power channel failure or output short circuit |
| | Current sense exceeds predetermined maximum limit with recovery | Temporary output power channel overload |
| | Current sense out of bounds from recent average value with recovery | Recent light fixture disconnection or connection |
| Power Channel Output Voltage Sense- Constant Current Configuration | Output voltage exceeds predetermined maximum DC output bus voltage | No Light Load Connection |
| | | Reverse polarity connection of light fixture |
| | | Light fixture voltage rating exceeds predetermined voltage rating on power channel |
| | | Power cable connection between LED driver and light fixture too long and/or insufficient wire gauge |
| | | Output power channel failure |
| | Output voltage is below predetermined minimum DC output bus voltage | Output power channel shorted |
| | | Light fixture failure |
| Power Channel Output Current Sense- Constant Current Configuration | Current sense exceeds predetermined maximum limit with no recovery | Interconnection of 2 output power channels (eg. +ve of channel 1 to -ve of channel 2) |
| | | Light fixture power rating exceeds predetermined power limit on power channel |
| | | Output Power Channel Shorted |
| DC Output Bus Voltage Sense | Out of voltage regulation range- with return to regulation range | Light Load fixture disconnection or connection |

FIG. 5

| Display | Parameter | Description |
|---|---|---|
| no dAt | No DMX Packets | The unit is not receiving any DMX signals |
| SHx | Shorted Output | A short is detected on the channel specified (x) |
| inx | Interconnection | An interconnection between outputs has been detected |
| chO | Output Channel Overload | An overload is detected on the channel specified |
| oPx | Channel open | No load is detected on channel (x) |
| Err 000 | Internal Fault | Error codes will represent a number corresponding to a particular fault condition. Codes TBD. |
| hot 00c | Thermal Fault | Internal temperature of the unit has exceeded TBD°C |
| Pr 000 | Load Power | Display % of full load power when prompted. |
| bLo | Bus Low | Voltage bus is low <40.4V |
| bhi | Bus is high | Voltage bus is > 44.4V |
| unc | Uncalibrated | Unit has not been calibrated in factory |
| cLd | Cold | Unit is cold (-30C?) |
| SbY | Standby | Unit is in standby mode |

FIG. 10

DATA ACQUISITION METHODS AND APPARATUS FOR A NETWORK CONNECTED LED DRIVER

CROSS-REFERENCE TO OTHER APPLICATIONS

This application is a continuation of U.S. patent application Ser. No. 17/706,733 now U.S. Pat. No. 11,632,832, filed on Mar. 29, 2022, which is a continuation of U.S. patent application Ser. No. 17/270,166, now U.S. Pat. No. 11,330, 683, filed on Feb. 22, 2021, which is a national stage filing of PCT/CA2019/051163 (Pub. No. WO/2020/037429), filed Aug. 23, 2019, entitled "Data Acquisition Methods and Apparatus for Network Connected LED Driver", which claims priority from U.S. Provisional Application No. 62/721,678 filed Aug. 23, 2018, the entire contents of each of which are hereby incorporated by reference.

TECHNICAL FIELD

The disclosure is generally directed at lighting apparatus, and more specifically, at data acquisition methods and apparatus for a network connected light emitting diode (LED) driver.

BACKGROUND

The integration of lighting systems with Internet of Things (IoT) devices as part of an Internet connected network enables such systems to remotely monitor, collect, and analyze data in order to improve, optimize and/or control lighting system performance while providing economic benefits.

One of the challenges of an IoT network connected lighting system is the integration of multiple IoT devices that include sensors and associated monitoring and data collection apparatus at various locations throughout the lighting system. Multiple external sensors are required to be connected back to a centralized control apparatus, integrated within multiple light fixtures and/or externally connected to multiple power conversion sources such as light emitting diodes (LED) drivers at different locations throughout the lighting system.

As a result, such IoT lighting system architectures increase the complexity and cost of IoT device integration for a lighting system that includes one power source with a single output power channel connected to a single light fixture.

Therefore, there is provided a novel method and apparatus for a network connected light emitting diode (LED) driver.

SUMMARY

With the adoption of high luminous efficacy solid state lighting (SSL) devices, such as light emitting diodes (LEDs), for general illumination applications that are also inherently direct current (DC) components, the practical application of a distributed low voltage direct current (LVDC) system architecture can be achieved. A distributed LVDC lighting system architecture includes a centralized power source with multiple output power channels that provide safe and accessible power and control to multiple light fixture loads. The centralized aspect of the power source, such as, but not limited to, a LED driver for powering multiple LED loads, may include an internal sensing and monitoring apparatus for monitoring external inputs into the lighting system as well as external loads connected to the lighting system. The disclosure provides a system and method of acquiring lighting system status in order to control as well as detect lighting system anomalies or faults and improve and/or optimize the performance of a network connected IoT lighting system.

In one aspect of the disclosure, there is provided a light emitting diode (LED) driver including a set of sensing circuits, the set of sensing circuits including a set of primary side sensing circuits and a set of secondary side sensing circuits; and a data acquisition apparatus including a primary side monitoring circuit for receiving and processing primary side data from the set of primary side sensing circuits; a secondary side monitoring circuit for receiving and processing secondary side data from the set of secondary side sensing circuits; a lighting status apparatus and a communication interface; wherein the lighting status apparatus and primary side monitoring circuit determine if a power anomaly or fault has occurred based on the primary side data and lighting status apparatus and the secondary side monitoring circuit determine if a power anomaly or fault has occurred based on the secondary side data; wherein if occurrence of a power anomaly or fault is determined, the communication interface transmits a signal to an external controller.

In another aspect, the LED driver further includes an isolation barrier for dividing the LED driver into a primary side and a secondary side. In another aspect, the isolation barrier is located within a DC/DC power converter. In yet another aspect, the primary side includes a power factor conversion apparatus. In a further aspect, the secondary side includes a DC output bus connected to the DC/DC power converter; a power monitor connected to the DC output bus; and a set of output power channels connected to an output of the power monitor, the set of output power channels associated with a set of light loads. In yet another aspect, the set of output power channels and the set of light loads are associated in a one-to-one relationship.

In another aspect, the set of sensing circuits include voltage sensing circuits and current sensing circuits. In an aspect, the data acquisition apparatus further includes a data isolator for isolating the primary side monitoring circuit from the secondary side monitoring circuit. In yet a further aspect, the data acquisition apparatus further includes an auxiliary power source. In another aspect, the data acquisition apparatus further includes a visual display for displaying an LED driver status. In another aspect, the data acquisition apparatus further includes a set of dials for receiving input from a user.

In another aspect of the disclosure, there is provided a method of determining faults within a light emitting diode (LED) driver including determining primary side and secondary side data via a set of primary side and secondary side sensing circuits; processing the primary side data, via a primary side monitoring circuit, to determine if a primary side power anomaly or fault has occurred; processing the secondary side data, via a secondary side monitoring circuit to determine if a secondary side power anomaly or fault has occurred, and transmitting a signal to a lighting system controller if it is determined that a power anomaly or fault has occurred.

In a further aspect, the method further includes storing the primary side and secondary side data if it is determined that no power anomaly or fault has occurred. In yet a further aspect, processing the primary side data includes comparing the primary side data with an expected value range; and determining that a primary side power anomaly has occurred if the primary side data is not within the expected value range. In yet another aspect, processing the secondary side data includes comparing the secondary side data with an expected value range; and determining that a secondary side power anomaly has occurred if the secondary side data is not within the expected value range.

DESCRIPTION OF THE DRAWINGS

Embodiments of the present disclosure will now be described, by way of example only, with reference to the attached Figures.

FIG. 5 is a table showing data acquisition parameters and various primary side and secondary side sense points internal to an LED driver;

FIG. 10 is table showing various displayable parameters representing different lighting system statuses.

DETAILED DESCRIPTION

The disclosure is directed at a method, system and apparatus for a network connected light emitting diode (LED) driver. In one embodiment, the disclosure includes an LED driver having a plurality of sensors that, depending on its location within the LED driver, communicate with a primary side or secondary side fault monitoring circuit. Based on signals received from the plurality of sensors, the monitoring circuits determine if a fault has occurred and performs the necessary actions to handle the detected fault.

Figure 7:
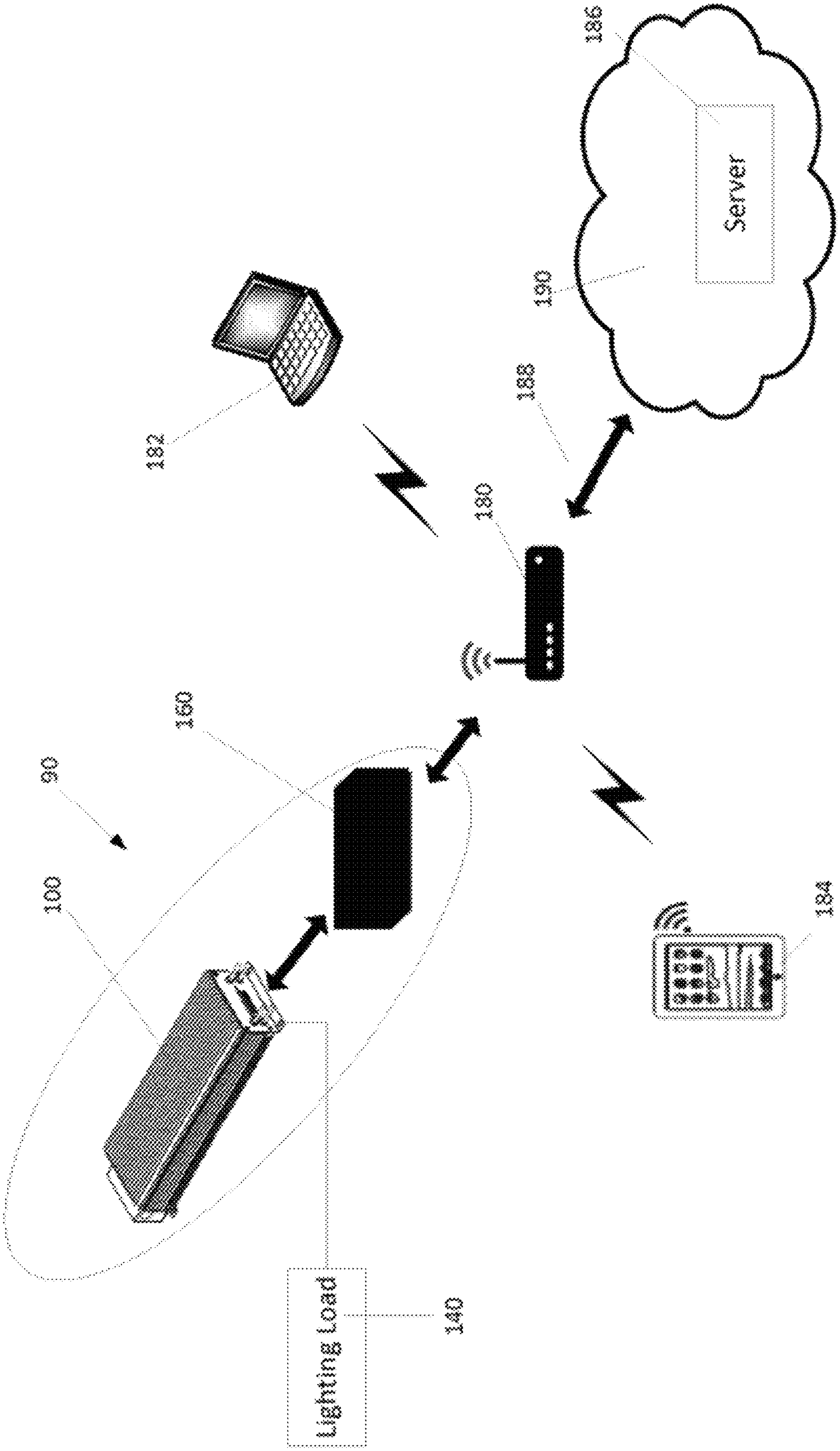
FIG. 7 is a schematic diagram of a network connected lighting system for IoT applications.

Turning to FIG. 7, a schematic representation of a network connected lighting system 90 in its operational environment is shown. In the current embodiment, the lighting system 90 is controlled via at least one Internet of Things (IoT) application. These applications may be executing on a peripheral device, servers and the like. The lighting system 90 includes at least one LED driver 100 and a lighting system controller 160 preferably with data acquisition capabilities. The LED driver 100 controls or provides power to a set of lighting loads 140 which may or may not form part of the lighting system 90. In other words, the system and method of the disclosure may be implemented as a stand-alone lighting system or may be integrated or retro-fitted into an existing lighting system or installed for existing lighting loads. The lighting loads 140 may be mounted remote from the lighting system 90.

For general illumination applications and tunable white lighting applications, the light loads 140 may include different types of LEDs such as, but not limited to, mid power LEDs, high power LEDs or organic LEDs (OLEDs) which require a constant DC drive current. For cove lighting applications, the light loads 140 may include LED tape or strip lighting that requires a constant voltage, such as 24 Vdc.

The lighting system 90 is connected to an IoT gateway 180 which provides a communication link between the lighting system 90 and peripheral devices, seen as a laptop 182 or a cellphone or Smartphone™ 184. Other peripheral devices are also considered and will be understood by one skilled in the art. The lighting system 90 may also be connected to a Cloud computing system 190 via the gateway 180. The cloud computing system 190 may include servers 186 to store, manage and process data.

In the event of an anomaly or fault within the lighting system 90, the data acquisition lighting system controller 160 transmits data associated with and/or notification of such an event to the various peripheral devices 182, 184 or to cloud computing system 190. Communication between the various peripheral devices 182, 184 and the lighting system 90 can be performed via one or a combination of various standards based wired and/or wireless technology. Wireless protocols can include Wifi™, Z Wave, Zigbee, Bluetooth™ Mesh and variations of such. In this manner, individual(s) can be alerted to the detected fault by the lighting system 90 via a message to the peripheral device. Communication between the IoT gateway 180 and the cloud computing system 190 is preferably via an internet protocol (IP) 188. In one embodiment, the cloud computing system 190 includes a set of servers 186 that may store data as well as conduct trend analysis based on information transmitted by the LED driver 100.

Figure 1:
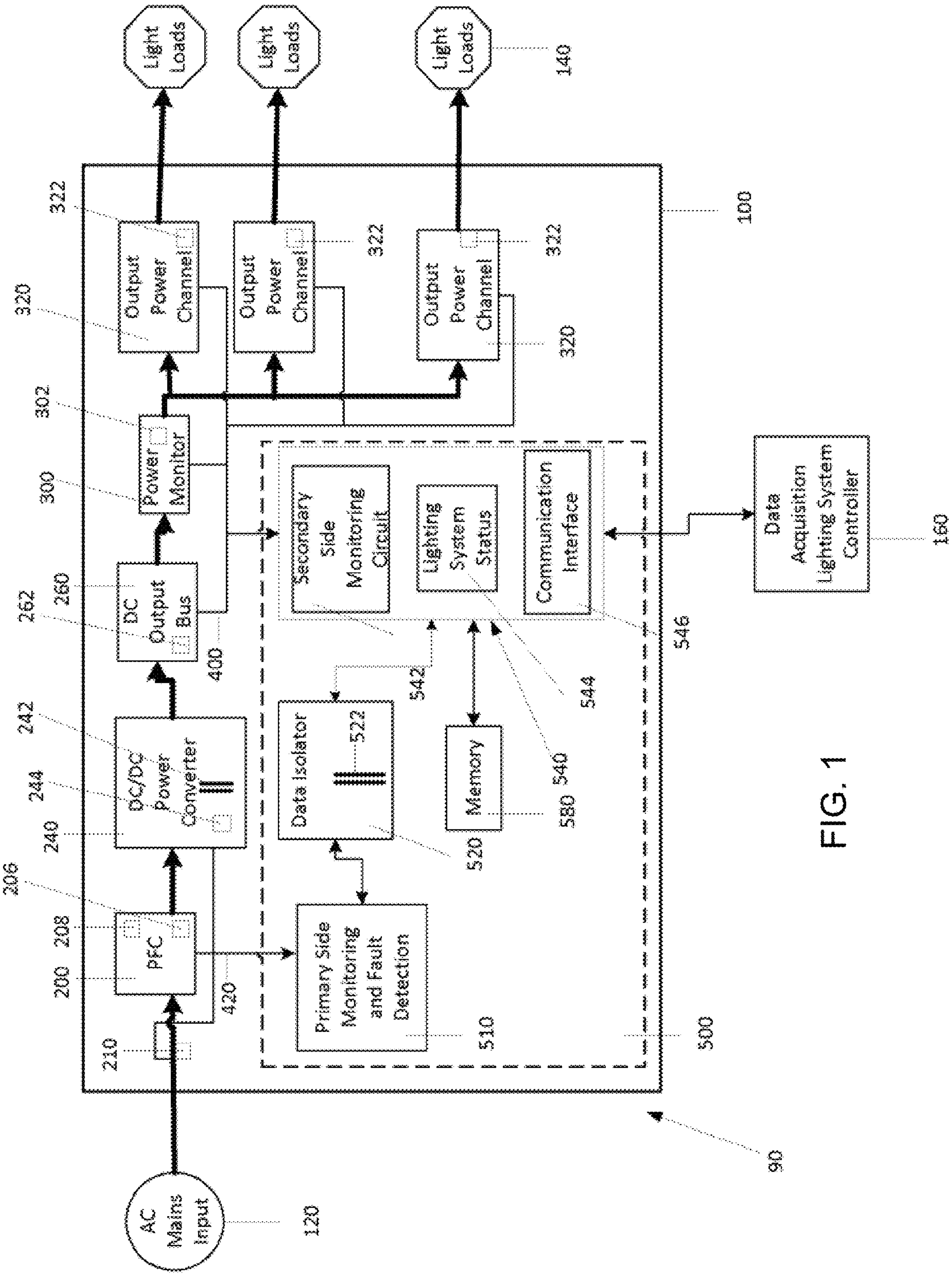
FIG. 1 is a block diagram of a network connected light emitting diode (LED) driver.

Turning to FIG. 1, a schematic block diagram of a first embodiment of a lighting system is shown. In the current embodiment, the lighting system 90 includes the network connected LED driver 100 and the data acquisition lighting system controller 160.

The LED driver 100 includes a power factor correction (PFC) converter 200 which receives power from an AC mains voltage source or input 120. The voltage source 120 is typically an external component and not part of the lighting system 90. The PFC circuit or converter 200 includes a voltage and/or current sensing circuit 206 along with a gate driving sensing circuit 208. The PFC converter 200 is connected to a DC/DC power converter 240 that includes a voltage and/or current sensing circuit 244 and a galvanic isolation barrier 242. The DC/DC power converter 240 is connected to a DC output bus 260 that includes a voltage and/or current sensing circuit 262. The DC output bus 260 is further connected to a power monitor 300, including a voltage and/or current sensing circuit 302, that is connected to a plurality of output power channels 320. Each of the plurality of output power channels 320 may include a voltage and/or current sensing circuit 322. An output of each of the output power channels 320 is connected to an individual light load 140 which may or may not be part of the lighting system 90. In some embodiments, the lighting system may be integrated with existing lighting loads, and in some embodiments, the lighting system may include its own lighting loads that are mounted in remote areas of the site being illuminated.

With respect to the galvanic barrier 242, the PFC circuit 200 may be seen as being on a primary side (of the galvanic barrier 242) while the DC output bus 260, power monitor 300 and output power channels 320 may be seen as being on a secondary side (of the galvanic barrier 242).

The LED driver 100 further includes a data acquisition apparatus 500 that includes a primary side monitoring and fault detection or primary side monitoring circuit 510 and a processing unit 540. It will be understood that the primary side monitoring circuit may also be in the form of a processor. In the current embodiment, both the monitoring circuit 510 and the processing unit 540 are coupled to at least one data-isolator device 520 including a galvanic barrier, or galvanic isolation barrier 522 to provide galvanic isolation, using either magnetic or optical isolation functionality, to isolate the primary side monitoring and fault detection circuit 510 from the processing unit 540.

The processing unit 540 includes a secondary side monitoring and fault detection or secondary side monitoring circuit 542, a lighting system status apparatus 544 and a communication interface 546. The communication interface 546 enables communication between LED driver 100 and the external data acquisition lighting system controller 160, such as to transmit lighting system status information. Communication between the interface 546 and the controller 160 is preferably via known communication protocols.

The data acquisition apparatus 500 may further include non-volatile memory 580 such as flash memory to store data collected by or from the primary side monitoring circuit 510 and the secondary side monitoring circuit 542. The memory 580 is preferably connected to the processing unit 540.

Although not shown, the processing unit 540 may further include any combination of components including a central processing unit (CPU), microcontroller, multiprocessor, a digital signal processor (DSP), and/or application specific integrated circuit (ASIC) capable of performing A/D and/or D/A conversion. The processing unit, or processor, 540 may further include modules for executing firmware/software programs.

The primary side monitoring circuit 510 is connected to receive information (such as in the form of a data signal) from the PFC converter 200 and DC/DC power converter 240. The secondary side monitoring and fault detection circuit 542 is connected to receive information from the DC output bus 260, the power monitor 300 and the output power channels 320. More specifically, the primary side monitoring and fault detection circuit 510 and associated voltage and/or current sense circuits on the primary side including voltage and/or current sense or sensing circuits 206, 210 and 244 as well as gate drive sensing circuit 208 are connected to the PFC power stage 200, the AC mains input 120, and the primary side of DC/DC power converter 240 via primary side data signal lines 420. Components on the secondary side of the DC/DC power converter 240 such as the DC output bus 260, power monitor 300, and output power channels 320 and their associated voltage and/or current sense circuits 262, 302 and 322 are connected to the secondary side monitoring and fault detection apparatus or circuit 542 via secondary side communication data signal lines 400. The communication between the primary side monitoring and fault detection circuit 510 and the lighting system module 544 may be assisted by the data-isolator device 522 via the processor 540.

In operation, the PFC converter 200, the DC/DC power converter 240, the DC output bus 260, the power monitor 300 and the output power channels 320 convert and transfer input AC power (from the AC mains input 120) into DC power suitable for operation, or powering, of the light loads 140. The galvanic barrier 242 provides electrical isolation between the voltage supplied by the AC mains input 120 on the primary side of the LED driver 100 from the secondary side DC output bus 260. As will be understood, not all components or circuit blocks and interconnections between such components are shown as they will be understood by one skilled in the art. For instance, the primary side of the power circuit or LED driver 100 may include components such as, but not limited to, an inrush current circuit, an EMI filter and/or a bridge rectifier. The LED driver 100 may also include a primary controller for regulating operation of the PFC converter 200 and the DC/DC power converter 240. Similarly, the secondary side of the LED Driver 100 may include an isolated feedback circuit coupled to a primary controller for regulating the DC output bus 260 to a fixed voltage level.

In a specific embodiment of operation of the LED driver 100, the PFC converter 200 operates as a switch mode boost converter and receives an AC sinusoidal mains input voltage in the range of 90 Vrms to 305 Vrms. This AC voltage is rectified and converted to a nominal 450 Vdc bus voltage that is then supplied to the DC/DC power converter 240.

The DC/DC converter 240 coupled to the DC output bus 260 may be seen as an isolated switch mode buck converter employing a half bridge LLC resonant topology. The DC output bus 260 is preferably, but not necessarily, regulated to maintain a near constant safety extra low voltage (SELV) output such as, for example, 42.4 Vdc. It is understood that other output voltages, not exceeding 60 Vdc, are possible.

The power monitor 300 monitors power directly transferred to the set of power channels 320 from the DC output bus 260 and indirectly to the set of light loads 140. The voltage and/or current sensing circuit 302 within the power monitor 300 may be connected in series to the positive side of the DC output bus 260 to sense and/or measure a proportional DC voltage level of the bus current transferred to the set of output power channels 320 and then transmits this sense or measured value to the secondary side monitoring circuit 542.

In a preferred embodiment, the output power channels 320 may be implemented as either a constant current source or a constant voltage source. A constant current source configuration is preferably implemented with a switch mode buck topology and hysteretic control since this implementation provides a regulated constant current output that may be configurable for various DC drive currents such as, but not limited to, 175 mA, 350 mA, 500 mA, and 700 mA. A constant voltage source is preferably implemented with a switch mode buck topology with negative feedback control where the output bus voltage is stepped from 42.4 Vdc to a regulated 24 Vdc output.

In one embodiment, the primary side monitoring and fault detection apparatus or circuit 510 includes a microcontroller with random access memory (RAM) and a Universal Asynchronous Receiver Transmitter (UART) to store and transmit and receive data in a bidirectional manner. In another embodiment, the primary side monitoring and fault detection circuit 510 includes a microcontroller with memory, at least one UART and firmware to receive data via the data lines 420, store the data in memory, execute various firmware programs and transmit data to the data isolator 520.

The primary side data lines 420 and secondary side data lines 400 transmit analog signals to the primary side monitoring circuit 510 and secondary side monitoring circuit 542, respectively, to assist in the monitoring and/or detection performed by the respective monitoring and fault detection apparatus. Both primary and second monitoring and fault detection circuits 510 and 542 may include ancillary circuits to scale, level shift, and filter the various signals received from their respective data signal lines.

The primary and secondary side sensing circuits may include voltage divider networks such as resistor networks to scale voltage values or precision resistors for current sensing. In one embodiment, existing sense circuits currently required for operation of the LED driver 100 may also be used for data acquisition purposes.

For example, in one embodiment, one of the sensing circuits 206 or 208 of the PFC convertor 200 may be a resistor divider network for sensing and regulating the 450 Vdc bus. Also, the sensing circuit 244 within the DC/DC converter 240 may be a sense resistor or current transformer that senses a primary side current for overload and fault protection. On the secondary side of the LED driver 100, the sensing circuit 262 of the DC output bus 260 may be a resistor voltage divider network to regulate the DC output bus 260. In another embodiment, at least one of the output power channels 320 may include a switch mode buck converter for a constant current output and a current sensing circuit, in the form of a current sense resistor, to regulate DC current supplied to the light load 140. As will be understood, these are some examples of the different voltage and/or current sensing circuits, however, others may be contemplated for the current disclosure.

Although external to the LED driver 100, the data acquisition lighting system controller 160 preferably includes a communication interface to receive lighting system status information from the LED driver 100. The controller 160 may include other components to implement lighting control functions, such as, but not limited to, transmitting dimming intensity information to the LED driver 100 to control the light loads 140.

In one embodiment of operation of the data acquisition apparatus 500, the power quality of the AC mains input voltage 120 is monitored by proxy within the LED driver 100 by sensing a PFC bus voltage via sensing circuit 206 and/or a PFC boost converter switch on-time represented via sensing circuit or sense point 208 within the PFC boost converter 200. Power quality anomalies that are detected may include AC mains transients such as, but not limited to, voltage dips or swells, voltage interruptions or the recycling of the AC input power by an end user. The sensing circuits transmit the measurements that are detected and the lighting system apparatus 544 processes the received measurements to determine if a fault or anomaly has occurred.

In one embodiment, the lighting system status apparatus 544 filters data by comparing it to predetermined limits or ranges. It may also analyze a snap shot of data by completing a statistical analysis. The filtering and analysis of data completed within the LED driver can reduce the amount of data transmitted in a wired and/or wireless network connected lighting system mitigating potential data traffic congestion and latency issues where detected anomalies require a priority response.

The signals or measurement sensed by some or all of the primary side sensing circuits or points 210, 206, 208, and 244 are preferably collected over a predetermined time period. In a preferred embodiment, the measurements or signals are collected over a duration of 18 ms at 1 ms intervals approximately corresponding to an AC mains voltage cycle or period. The collection of signals, which may be referred to as a snap shot of data, is temporarily stored in random access memory (RAM) within the primary side monitoring and fault detection circuit or apparatus 510. The set of eighteen (18) samples is then transmitted as a packet from the primary side monitoring and fault detection circuit 510 to the lighting system status apparatus 544 within the processing unit 540. In this mode of operation, a data snap shot is taken every 0.5 seconds (seen as a data snap shot time interval) for transmission via data isolator 520 such as an asynchronous serial communication apparatus.

In the event of one or more input AC power quality anomalies, the number of samples in the snap shot set as well as the snap shot time interval and subsequent transmission rate of packets can be increased or decreased depending on the priority assigned to analyze data from the sensing circuits 206, 208, 210 and 244.

For example, if there is a repetitive power quality issue with a lighting system installation or a lighting load, the number of samples can be increased from 18 samples to 36 samples per AC mains cycle and/or the snap shot interval and transmission rate of the packet of data can be increased to include every AC mains cycle or 16.6 ms from every 0.5 seconds snap shot interval. This may be controlled by the processing unit 540 based on the determination or determinations by the primary side and/or secondary side monitoring circuits.

The data acquisition apparatus 500 may also monitor the LED driver 100 for anomalies or fault conditions on the secondary side of the driver 100 via the secondary side fault detection circuit 542. Secondary side anomalies can include, but are not limited to, overload or short circuit of output power channels 320 and/or light loads 140, disconnection or failure of light loads and reverse polarity or improper interconnection between light loads. Internal fault conditions can also include a failure of an output power channel.

In one example, sensing circuit 262 (within DC output bus 260) may monitor the output bus voltage from the DC output bus 260 and current sensing circuit 302 may monitor current for a set of associated power channels 320 and light loads 140. Either or both voltage and current sensors or sensing circuits 322 (within the individual output power channels 320) may monitor output cable and light load voltages and current being delivered to each individual light load 140.

A snap shot of secondary side sensor data from all or any combination of the sensing circuits 262, 302 and 322 may be collected at predetermined intervals such as every five (5) minutes. The snap shot time interval for the secondary side data can also be increased or decreased for each sensing circuit collectively or individually depending on the priority of the sensed data as well as the need to retain this data in the non-volatile memory 580 for future retrieval by the data acquisition lighting system controller 160.

The lighting system status apparatus 544 preferably analyzes data or measurements submitted from the primary side and secondary side monitoring circuits over a predetermined period of time. For example, in terms of filtering, the lighting system apparatus 544 can select a smaller set of data such as a low or minimum or high or maximum values from a sensing circuit. In terms of analysis, the data from the sensing circuits can be compared to calculated statistical parameters based on historical data and/or to predetermined limits and/or ranges for each sensing circuit prior to logging of the data to memory 580.

Calculated statistical parameters based on at least one or more snap shots of data over a predetermined period of time from various internal sense points can include but are not limited to average or arithmetic mean, median, standard deviation and/or moving average. The lighting system status apparatus 544 can also filter this data for specific characteristics or other predetermined criteria.

The data (or snap shot of data) collected over the predetermined time interval whether or not it is within predetermined parameter limits or ranges, is preferably logged into non-volatile memory 580 for later retrieval by the data acquisition lighting system controller 160 via communication interface 546. If the data collected or sensed is determined to be out of the predetermined or expected range, a notification of the anomaly or fault and its associated data is queued for priority transmission to the data acquisition lighting system controller 160. In the event of an anomaly or fault, the data acquisition lighting system controller 160 prioritizes the event data for transmission to the cloud computing system 190. The cloud computing system 190 may be part of a building management service that would provide building facility personnel with actionable data to respond to the lighting system fault(s) or anomalies. If the data is within predetermined parameter limits or ranges, the data acquisition lighting system controller 160 may also poll the LED driver 100 at regular intervals to retrieve data and transmit this data to the cloud computing system 190. The data may be stored on a data server in the cloud for further lighting system improvements as part of a building management service.

In an embodiment, with reference to the lighting system status apparatus 544, the analysis of a power quality anomaly, such as a voltage interruption, by the lighting system status apparatus 544 can include the sampling of the PFC bus voltage by the sensing circuit 206.

In this example, the PFC converter voltage is regulated to a nominal 450 Vdc with a predetermined load and line regulation range of +/−2% or a minimum limit of 441 Vdc and a maximum limit of 459 Vdc. In the event of an interruption of AC mains voltage for a half cycle duration (8.3 milliseconds), the PFC bus voltage begins to collapse and drops below the +/−2% regulation range. After the AC mains voltage is restored, the PFC voltage control loop restores the bus voltage to the nominal 450 Vdc with a typical overshoot above the 2% regulation range lasting for several milliseconds.

Sampling the PFC bus voltage at a 1 ms rate will detect the initial drop in voltage as well as the recovery to its regulation range of +/−2%. The lighting system status apparatus 544 computes this out of bounds, or power, anomaly and prioritizes this event for notification and transmission to the lighting system controller 160. As some detected faults and/or anomalies may result in a noticeable degradation of lighting quality, such as a noticeable drop of light intensity or black out that a building management service may need to investigate especially on an on-going basis, this fault or anomaly may be designated as a priority fault that needs to be addressed in a more accelerated manner. In this example, substandard quality of AC mains electrical power whereby voltage and/or frequency are not within limits may require mitigation approaches such as power conditioning apparatus to improve lighting system performance.

In another embodiment, apparatus for detecting a power quality anomaly on the primary side such as an AC mains transient voltage swell may include apparatus to sense the gate drive on-time of the switch via sense point 208 in the PFC converter 200 and subsequently determine the peak AC mains voltage by proxy. In one embodiment, a precise AC mains voltage peak value is determined by sense point 208 and a general AC mains voltage transient event may be detected by sense point 206 on the PFC bus but would not be able to determine the "degree" of the event.

In this example, the on-time is sensed by a counter within the primary side monitoring and fault detection apparatus 510 that only counts when the PFC switch is switched on. The monitoring of switch gate on-time can determine the instantaneous input level of the AC mains voltage, particularly peak voltage levels, where the PFC converter 200 is operating in either critical conduction mode or in continuous conduction mode and under load conditions.

For reference, in a boost PFC converter topology, the instantaneous AC mains voltage can be expressed as:

$$V_{acinst}=V_{pfc}*(1-D) \quad \text{Eq. 1}$$

where $V_{pfc}$=output bus PFC voltage

The duty cycle is expressed as:

$$D=t_{on}/T_{per} \quad \text{Eq. 2}$$

where D is duty cycle of the PFC switch with on-time duration ton over a switch period of $T_{per}$.

In the boost PFC converter 200, with a transition mode of operation, both the duty cycle, D, and corresponding switching frequency vary with the instantaneous value of the AC mains voltage. During a 1 ms snap shot interval of the sinusoidal AC mains voltage cycle, an average duty cycle $D_{avg}$ includes multiple PFC switching cycles and multiple on and off durations of the switch.

This average duty cycle ($D_{avg}$) can be determined by a counter that increments during the on-time duration of the switch over a 1 ms snap shot interval. For example, at an AC mains input voltage of 277 Vac, if the counter has a given maximum or high count of 250 with 4 microsecond increments, over the 1 ms interval corresponding to a portion of the AC mains voltage mains cycle, the counter starts with an initial value of 124 and increments to a final value of 157 representing an on-time count of 33 for the PFC switch. Based on the on-time count and corresponding calculated off time count, the average duty cycle can be calculated from Eq. 2. By sensing the PFC converter bus voltage 206 measuring 450 Vdc, the instantaneous peak voltage $V_{acinst}$, and Vrms can be determined as shown in Table 1.

TABLE 1

AC Mains sensing by proxy

| On-Time Count | Off-Time Count | Senses PFC Bus Voltage Vpfc (Vdc) | Calculated Duty Cycle 'Davg' | Calculated Vacinst (Vpk) | Calculated Input Voltage Vrms = Vacinst/√2) |
|---|---|---|---|---|---|
| 33 | 217 | 450 | .132 | 390.6 | 277 |
| 11 | 239 | 450 | .044 | 430.2 | 304 |

Table 1 shows an example of identifying an AC mains transient event by sensing the PFC bus voltage and sensing the PFC switching on-time in order to compute an AC mains voltage swell of 304 Vrms. The lighting system status apparatus 544 computes, or calculates, this out of bounds anomaly and prioritizes this data for notification and transmission to the data acquisition lighting system controller 160.

With reference to secondary side anomalies, the power monitor current sensing circuit 302 can detect an anomaly for a set of light loads in a lighting zone. As an example, a lighting zone may have a set of four (4) light loads 140 connected to four (4) power channels 320 operating at 25 W each for a total power of 100 W. The set of power channels 320 is coupled to the power monitor 300 that should sense a nominal current value of 2.36 A based on a 42.4 Vdc regulated output bus.

A rapid reduction in sensed current of 25% as seen by the power monitor sensing circuit 302 can indicate a possible disconnection or a failure of a light fixture in the lighting zone.

In a further example, a combination of data from various sense circuits or points can assist in determining what type of anomaly or fault may have occurred. A connection or disconnection of one or more light loads representing a change in output power such as 25% results in a DC output bus 260 voltage transient anomaly detected by sensing circuit 262. In the same time interval, the power monitor 300 including the current sensing circuit 302 may detect a step change in load current. Based on an analysis by the lighting system status apparatus 544, the type of anomaly or fault can be determined, in this case, a connection or disconnection of a light load.

After an analysis of the sensed measurements or signals by the lighting system apparatus 544, if an anomaly is not detected, the data is stored in non-volatile memory 580 as a log file so that it can be stored for later retrieval, if desired.

In a preferred embodiment, a snap shot data packet is stored as a 64 byte entry and in one implementation, a 1 megabyte (MB) memory space can store approximately 55 days of lighting system data. The data acquisition lighting system controller 160 polls the LED driver 100 for retrieval of all or part of the data log at predetermined time internals.

It is understood that the size of a data packet in terms of the number of bytes can be increased or decreased as the number of samples and/or snap shot interval is varied.

A standards based lighting protocol may include but is not limited to a protocol such as Remote Device Management (RDM) or DALI (Digital Addressable Lighting Interface) or DALI-2 or any variations of such protocols. The RDM protocol is defined in E1.20 Remote Device Management over DMX512 Networks. DALI-2 requirements are defined in a group of standards based on IEC 62386 such as IEC 62386-102; General Requirements Control Gear, and IEC 62386-207; Particular Requirements for Control Gear-LED Modules. A standards based LAN (Local Area Network) protocol may include but is not limited to an Ethernet protocol defined in a group of standards based on IEEE802.3 or variations of such a protocol.

In one embodiment, transmission of data and notification of anomalies by the communication interface 546 is implemented by a lighting based protocol such as RDM or DALI 2. In another embodiment, transmission of data and notification of anomalies by the communication interface 546 is implemented by an Ethernet protocol. The data acquisition lighting system controller 160 can include an integrated Ethernet switch to connect multiple LED drivers 100 to the LAN or the Ethernet switch may be an external apparatus coupled to the data acquisition lighting system controller 160.

Figure 2A:
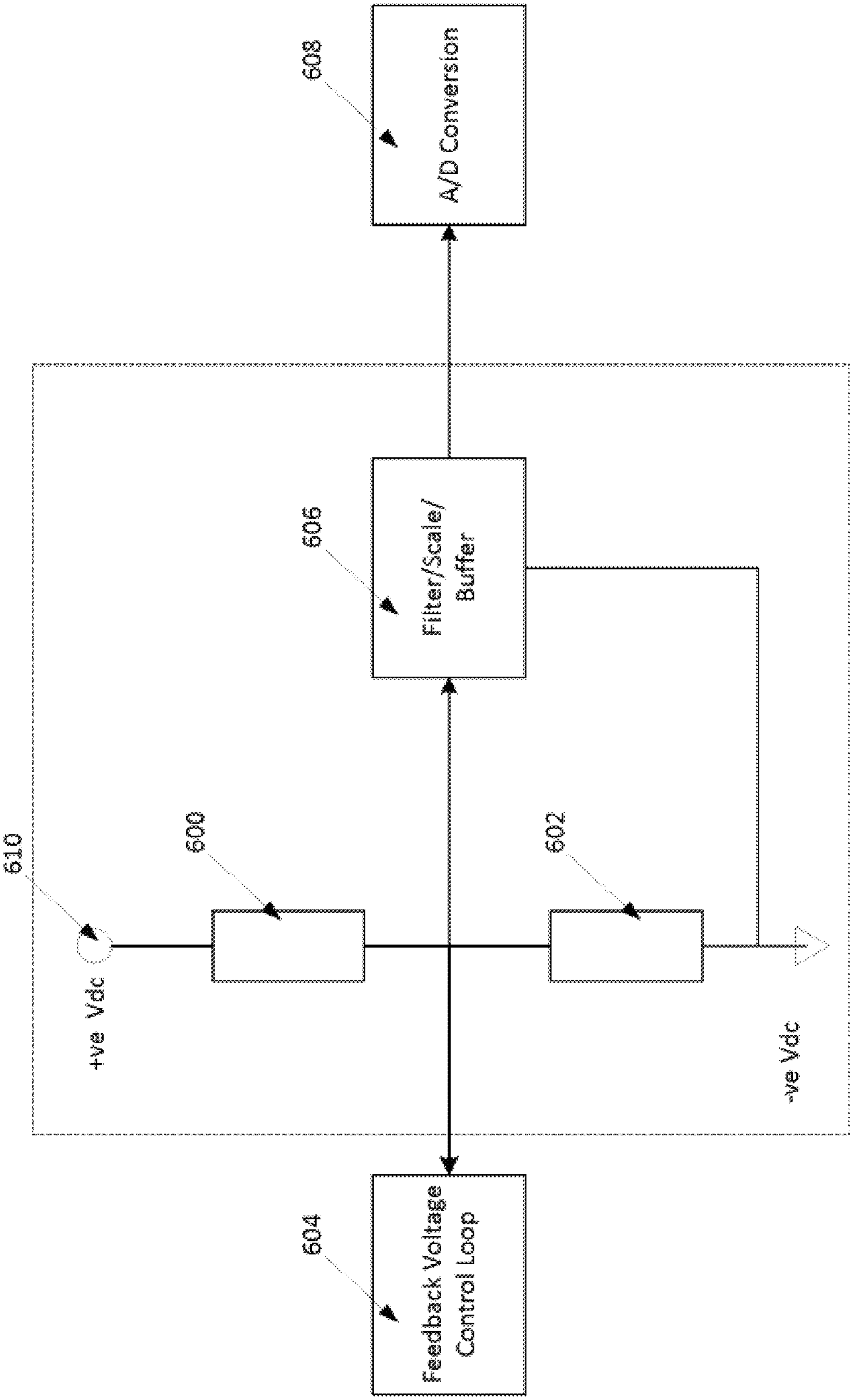
FIG. 2*a* is a schematic diagram of a LED driver internal voltage sense point.

Turning to FIG. 2*a*, a schematic diagram of a voltage sense circuit or sense point for sensing an internal voltage is shown. In the current embodiment, the sense circuit is implemented for the voltage regulation of a DC bus as well as implemented as a sensing circuit for detection of lighting system anomalies. As an example, this voltage sensing circuit of FIG. 2*a* may represent sensing circuit 206 within the primary side PFC power conversion stage 200 and/or the sensing circuit 262 associated with the secondary side DC Output Bus 260 where DC voltage regulation is required. The sensing circuit 206 or 262 includes a voltage divider network with a pair of scaling resistances 600 and 602 connected to an ancillary circuit 606. In one embodiment, the circuit 606 may include various components such as, but not limited to, low pass filter RC (resistor, capacitor) components, an OP amp buffer and/or additional resistor divider components as needed to scale the analog voltage to an appropriate level for the analog to digital (A/D) conversion circuit 608 located in the primary or secondary monitoring and fault detection apparatus. Also shown is the feedback voltage control loop apparatus 604 implemented to regulate the DC bus 610 to a required nominal level.

Figure 2B:
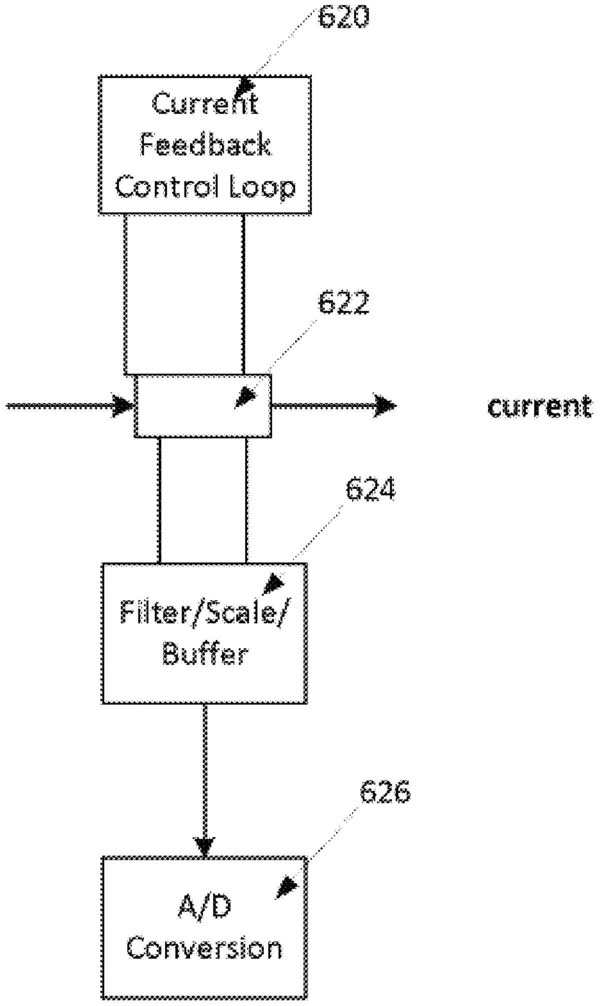
FIG. 2*b* is a schematic diagram of a LED driver internal current sense point.
Figure 3:
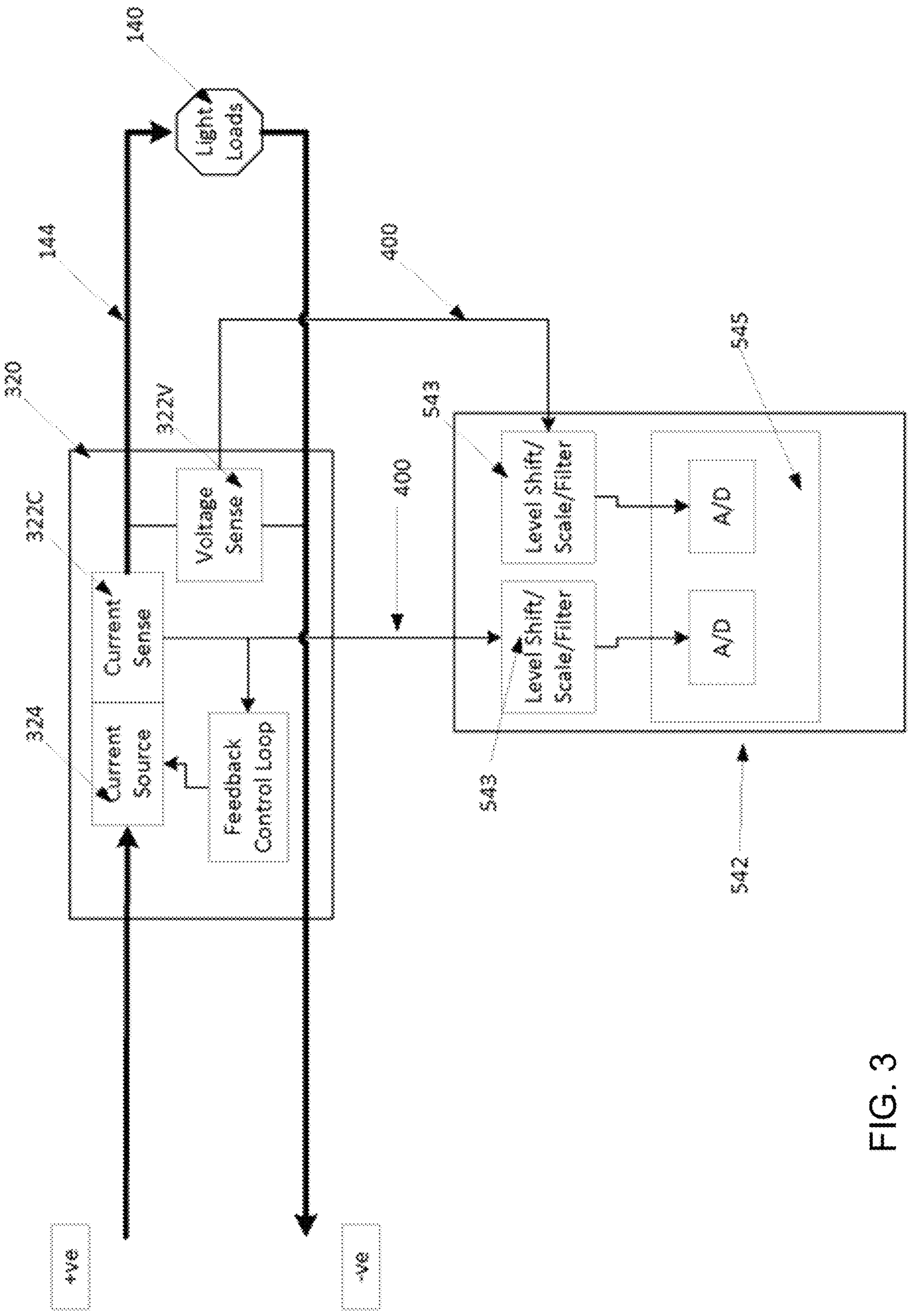
FIG. 3 is a block diagram showing an embodiment of a power channel implemented as a current source.

FIG. 2*b* is a schematic diagram of a current sense circuit or sense point for the sensing of internal current at various points within the LED driver 100 such as sense points 302 and 322C (in FIG. 3). The sensing circuit of FIG. 2*b* senses a current level that passes through the sensing circuit. The circuit includes a current feedback control loop 620 that is connected to a resistive component 622 that receives the current. The resistive component 622 is further connected to a filter/scale/buffer component 624 and an A/D converter 626.

FIG. 3 is a block diagram showing an embodiment of a power channel 320. In this figure, the power channel 320 is implemented with a current source 324 and both a current sensing, or sense circuit 322C and a voltage sensing, or sense circuit 322V. In this embodiment, the voltage and current sense circuits 322C and 322V assist to identify various anomalies on the secondary side of the lighting system or LED driver 100 by measuring current and voltage levels for processing by the secondary side monitoring circuit 542.

In one embodiment, the voltage sensing circuit 322V monitors the output voltage across the cabling 144 supplying the voltage to remotely connect light load 140 while the current sensing circuit 322C monitors the output current through the cabling 144 and the light load 140.

Measured or sensed analog signal values from the current and voltage sensing circuits are transmitted via data lines 400 to the scaling, level shift, and buffer circuits 543 located in the secondary side monitoring and fault detection apparatus 542. The scaling, level shift and filtering circuits 543 adapt the analog signals to suitable signals for the A/D conversion circuits 545. In one embodiment, the conversion circuits have a sampling resolution of 10 to 12 bits.

In one embodiment of operation, a shorted power channel output or light load failure can be determined by sensing both the voltage across the output power channel 320 and the current through the light load 140. If the constant current source 324 is configured to provide a 700 mA drive current and the output voltage range of the power channel 320 is a predetermined range of 12 Vdc to 40 Vdc, a shorted output would have the current sensing circuit 322C detect a drive current equal to or greater than 700 mA. At the same time, the voltage sensing circuit 322V would detect a voltage level of less than 12 Vdc. The combination of these two sensed signals indicates a continuous current flow through a reduced impedance which would be seen as an anomaly by the secondary side monitoring and fault detection circuit 542 and the light system apparatus 544. In another example of an overload condition determination, the rated load of a power channel is established at 40 Vdc at 700 mA representing a power rating of 28 watts. An overload condition can be detected by a connection of a light load with a rating of 42 Vdc at 700 mA representing a power rating of 29.4 watts. The combination of voltage and current sense point data in this instance can be used by the secondary side monitoring circuit to detect a power overload condition.

In both instances, the lighting system apparatus 544 as shown in FIG. 1, based on an analysis of the sense point data or measured signals, can determine when an anomaly has occurred on the output, or secondary, side of the lighting system and prioritizes the data and notification for transmission of such an event.

Figure 4:
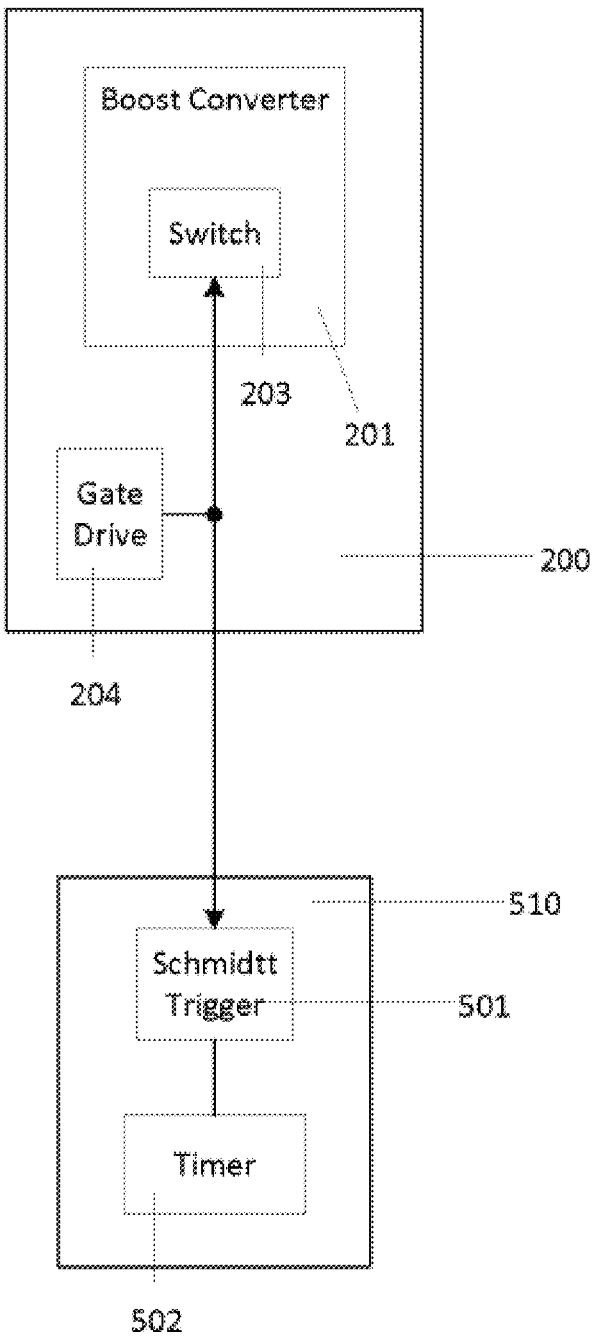
FIG. 4 is schematic diagram of apparatus for sensing the on-time of a gate drive semiconductor switch.

Turning to FIG. 4, an embodiment of apparatus for sensing the on-time of a gate drive semiconductor switch is shown. In this embodiment, the PFC power converter stage 200 includes a boost converter switch mode topology 201 and a semiconductor switch 203 such as a MOSFET. The semiconductor switch 203 is operated by a gate drive circuit 204 which is part of a PFC controller integrated circuit (IC). In the current embodiment, the gate drive circuit 204 is connected to a Schmitt trigger 501 which is connected to a timer 502 located in the primary side monitoring and fault detection apparatus 510. The timer 502 updates at a rate of 4×106 times per second or in 250 ns (nanosecond) intervals based on a Schmitt trigger threshold of 4 volts or greater.

By determining how far the timer has counted, the switch on-time can be established. For example, a count of 10 would determine a switch on-time of 2.5 microseconds. A count of 20 would determine a switch on-time of 5 microseconds. It is understood that the implementation of an on time counter coupled to a gate drive of a semiconductor switch to determine duty cycle and associated input or output voltages can be applied to other power conversion topologies such as, but not limited to, a buck converter.

FIG. 5 is a table showing various primary side and secondary side sensing circuits internal to an LED driver with associated data collection possibilities. The sensor readings are analyzed by the lighting system status apparatus to identify anomaly or fault possibilities that have occurred within the lighting system.

An example of a fault condition that can be detected include an interconnection between two power channels implemented with constant current outputs. In this instance, a connection between the positive output (+ve) of one channel to the negative output (—ye) of another channel results in excessive current being detected by a current sense point in one of the power channels.

Figure 6:
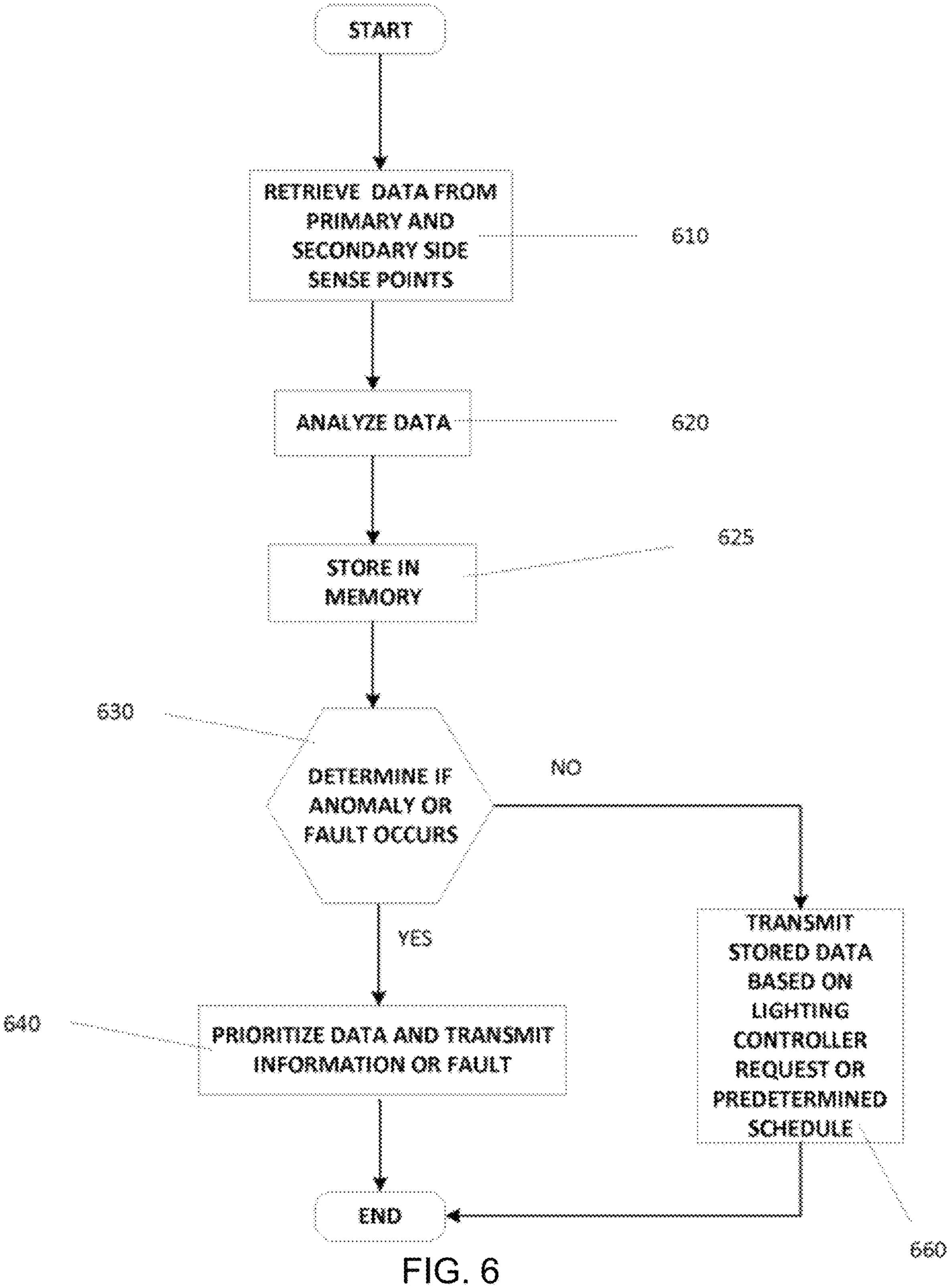
FIG. 6 is a flowchart of an embodiment of a of data acquisition method for a lighting system.

FIG. 6 is a flow chart of a method of data acquisition for a lighting system. In the current embodiment, the lighting system includes an LED driver connected to the AC mains and to a set of output power channels connected to a set of light fixture loads such as schematically shown in FIG. 1.

The primary side and secondary side monitoring and fault monitoring circuits receive measurements or data readings from the primary and isolated secondary side sensing circuits collect data readings from the various sensing circuits located within components of the LED driver (610). The lighting system status apparatus then filters and/or analyzes the received measurements or data readings (620) over a predetermined period of time. The analysis of the data may be completed over a predetermined period of time and may include comparing sensor readings to predetermined limits and/or calculated statistical parameters based in historical data. In another embodiment, the data readings are filtered for specific characteristics or predetermined criteria and then processed after being filtered. The data readings are then stored in nonvolatile memory (625) for subsequent retrieval.

The lighting system status apparatus then determines if an anomaly or fault has occurred (630) based on an analysis of the data. If it is determined that an anomaly or fault has occurred, the data and/or notification of such an event are prioritized for immediate transmission to the data acquisition lighting system controller (640). In other words, a notification or indication of the detection of the anomaly or fault is transmitted to the lighting system controller.

If no anomaly or fault is detected or determined, the received data readings are maintained in non-volatile memory. At a predetermined time schedule or based on a request from data acquisition lighting system controller, the stored data readings are then transmitted in whole or in part from the memory to the lighting system controller or another external component (660).

Figure 8:
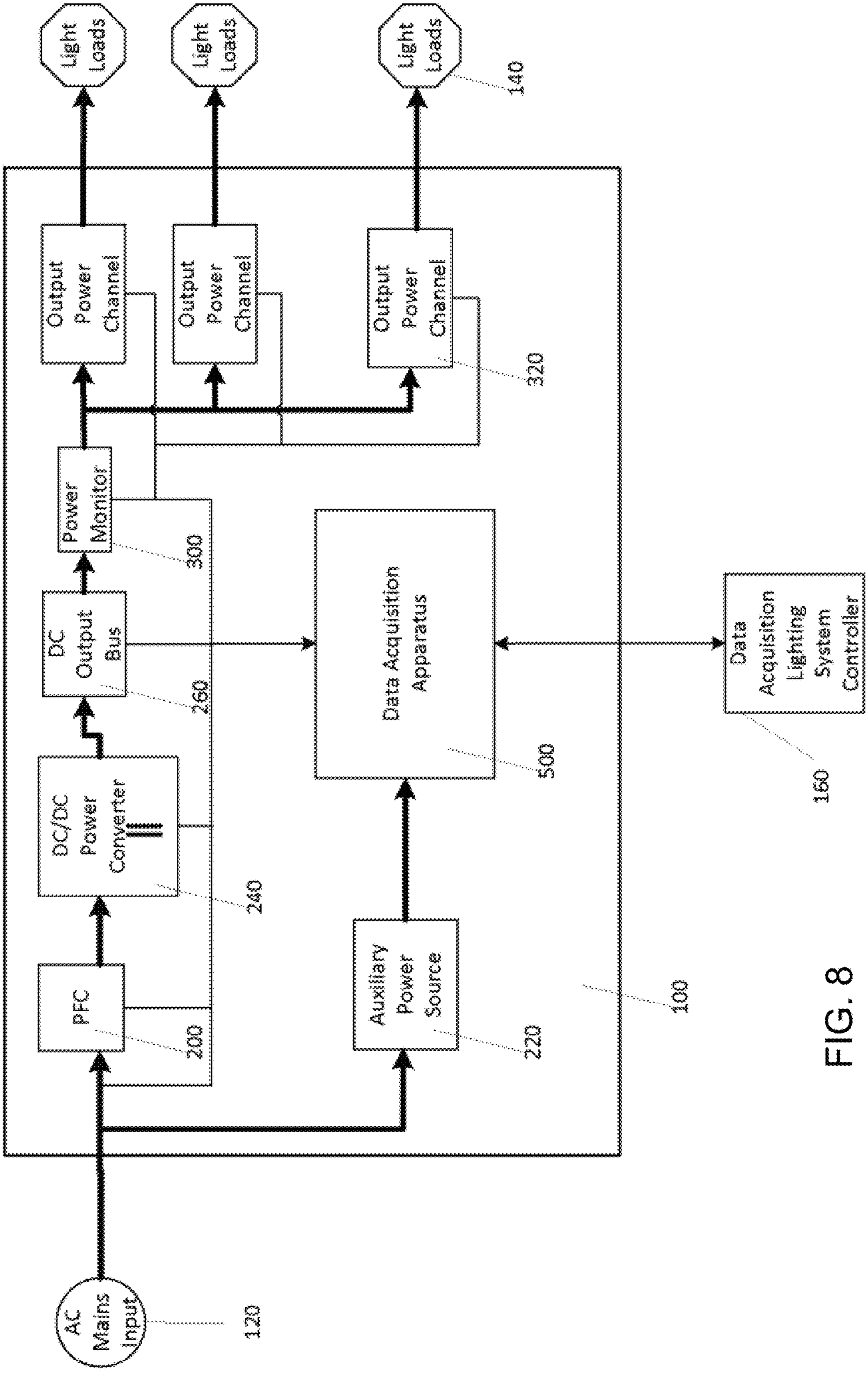
FIG. 8 is block diagram of another embodiment of a network connected LED driver.

FIG. 8 is a block diagram of an alternate embodiment of an LED driver with data acquisition capabilities. Although not all components are shown, the data acquisition apparatus of FIG. 8 may include the same components as the apparatus 500 of FIG. 1 such as the sensing circuits. In the current embodiment, the LED driver 100 includes an auxiliary power source 220 implemented using a buck or buck-boost converter topology. More specifically, such power conversion topologies can include a forward converter or a flyback topology configured to independently supply the required power and voltage levels to the data acquisition apparatus 500.

In operation, the auxiliary power source 220 provides power to the data acquisition apparatus 500 in the event of a component failure of the LED driver 100 or power circuit. Alternatively, the auxiliary power source 220 can continue to power the data acquisition apparatus 500 in the event of a latch off anomaly or fault experienced by the LED driver.

A latch off may occur as a result of the activation of various internal protection circuits such as over voltage or over current protection circuits due to an anomaly or internal fault. For example, such activation can arise as a result of power quality anomalies on the AC mains input 120 or overload events on the output light load side 140 or as an internal component failure within the LED driver 100.

The maintenance of power to the data acquisition apparatus 500 permits the sensing of a power circuit failure or a latch off event to be communicated via the data acquisition apparatus 500 to the data acquisition lighting system controller 160 even after the fault or latch off has occurred.

Figure 9:
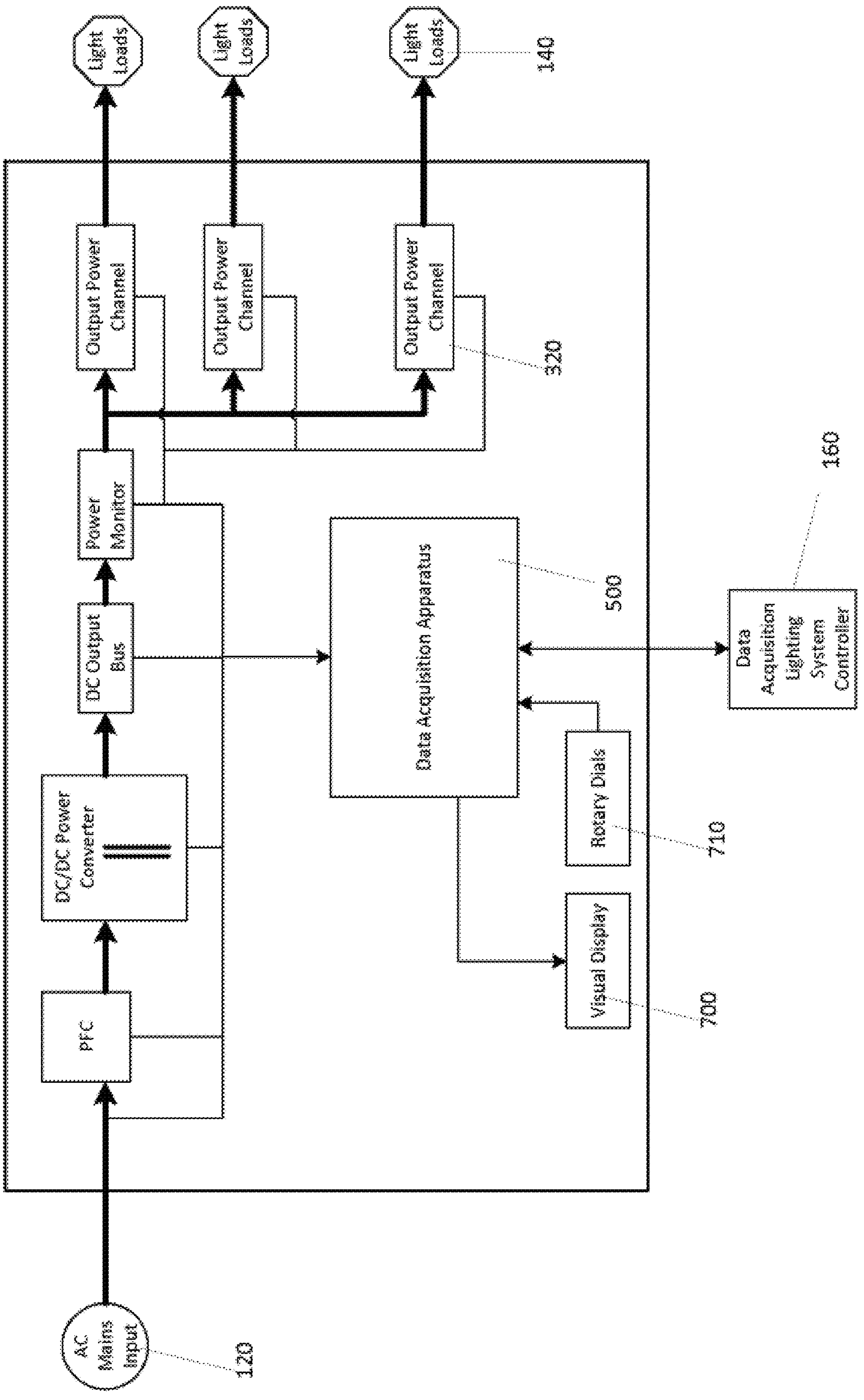
FIG. 9 is a block diagram of an alternate embodiment of a network connected LED driver with data acquisition capabilities.

FIG. 9 is a block diagram of an alternate embodiment of an LED driver 100 with a visual display 700. The visual display 700 can include either an LED segment display, an LCD (liquid crystal display) or an OLED (organic light emitting diode) display to provide data and notifications of lighting system status. Based on signal information transmitted by the data acquisition apparatus 500 to the display 700, the display can then provide information to a user. The visual display 700 can also be prompted to query various parameters via a set of rotary dials 710 with a decimal range of 0-999 or alternatively via a key pad (not shown).

For example, the rotary dials can be set to a value or decimal value of 909 which will display the DC output bus voltage. The code 909 is transmitted to the processor that can then access a look-up table to determine the information being request. Once the processor determines the requested information, the information can be retrieved and sent to the visual display for display. Similarly, the rotary dials can be set to a value of 905 to display the calculated output power at the output of the power monitor apparatus based on a voltage value measured by the sensing circuit 262 of the DC output bus and the power monitor current sensing circuit 302 as referenced in FIG. 1.

FIG. 10 is a table showing example parameters that can be displayed on the visual display. In one embodiment, these symbols may be used to indicate lighting system status. The table includes parameters and error codes that can be measured internally within the LED driver and displayed. The table also includes error codes that can be generated and displayed to identify internal faults within the LED driver.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure.

In the preceding description, for purposes of explanation, numerous details are set forth in order to provide a thorough understanding of the embodiments. However, it will be apparent to one skilled in the art that these specific details may not be required. In other instances, well-known structures may be shown in block diagram form in order not to obscure the understanding. For example, specific details are not provided as to whether elements of the embodiments described herein are implemented as a software routine, hardware circuit, firmware, or a combination thereof.

Embodiments of the disclosure or components thereof can be provided as or represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor or controller to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor, controller or other suitable processing device, and can interface with circuitry to perform the described tasks.

What is claimed is:

1. A light emitting diode (LED) driver, comprising:

a sensing circuit in a power factor correction converter;

a set of sensing circuits, the set of sensing circuits including the sensing circuit in the power factor correction converter and a set of secondary side sensing circuits; and a data acquisition apparatus including:

a primary side monitoring circuit for receiving and processing primary side data from the sensing circuit in the power factor correction converter;

a secondary side monitoring circuit for receiving and processing secondary side data from the set of secondary side sensing circuits;

a lighting status apparatus, and a communication interface;

wherein the lighting status apparatus and the primary side monitoring circuit are configured to determine if a power anomaly or fault has occurred based on the primary side data and the lighting status apparatus and the secondary side monitoring circuit are configured to determine if a power anomaly or fault has occurred based on the secondary side data; and wherein if occurrence of a power anomaly or fault is determined, the communication interface is configured to transmit a signal indicative of the power anomaly or fault to an external controller.

2. A light emitting diode (LED) driver, comprising:

an AC input;

an isolation barrier having a primary side and a secondary side;

at least one output to drive one or more LEDs;

primary side circuitry coupled between the AC input and the primary side of the isolation barrier, the primary side circuitry comprising at least one primary side sensing circuit and power factor correction converter that includes a first primary side sensing circuit of the at least one primary side sensing circuit;

secondary side circuitry coupled between the secondary side of the isolation barrier and the at least one output, the secondary side circuitry including at least one secondary side sensing circuit;

a communication interface; and a processor communicatively coupled to the at least one primary side sensing circuit, the at least one secondary side sensing circuit and the communication interface, and programmed to:

determine whether a power anomaly or fault has occurred based on both first data received from the at least one primary side sensing circuit and second data received from the at least one secondary side sensing circuit; and transmit a message to an external controller through the communication interface in response to determining that the power anomaly or fault has occurred.

3. The LED driver of claim 2, wherein the isolation barrier is located within a DC/DC power converter.

4. The LED driver of claim 3, wherein the secondary side circuitry comprises:

a DC output bus connected to the DC/DC power converter; and a set of output power channels coupled between the DC output bus and the at least one output.

5. The LED driver of claim 4, wherein each output power channel of the set of output power channels is respectively associated with one output of the at least one output.

6. The LED driver of claim 2, the at least one secondary side sensing circuit comprising both voltage sensing circuits and current sensing circuits.

7. The LED driver of claim 2, the at least one primary side sensing circuit comprising both voltage sensing circuits and current sensing circuits.

8. The LED driver of claim 2, further comprising a data isolator for isolating the at least one primary side sensing circuits from the processor.

9. The LED driver of claim 2, further comprising a visual display coupled to the processor for displaying an LED driver status.

10. The LED driver of claim 9, further comprising a user input device coupled to the processor to request information to display on the visual display.

11. A method of determining faults within a light emitting diode (LED) driver comprising:

receiving primary side data from a set of primary side sensing circuits of the LED driver, the set of primary side sensing circuits located on a primary side of an isolation barrier and including at least one sensing circuit in a power factor correction converter of the LED driver;

receiving secondary side data from a set of secondary side sensing circuits of the LED driver, the set of secondary side sensing circuits located on a secondary side of the isolation barrier;

processing both the primary side data and the secondary side data using a processor in the LED driver to determine whether a power anomaly or fault has occurred; and transmitting a signal from the LED driver to an external controller in response to determining that a power anomaly or fault has occurred.

12. The method of claim 11, further comprising storing the primary side data and secondary side data for retrieval by the external controller.

13. The method of claim 11, wherein the primary side data comprises both voltage values and current values.

14. The method of claim 11, wherein the secondary side data comprises both voltage values and current values.

15. The method of claim 11 wherein processing the primary side data comprises:

comparing the primary side data with a first expected value range; and determining that a primary side power anomaly has occurred if the primary side data is not within the first expected value range.

16. The method of claim 11, wherein processing the secondary side data comprises:

comparing the secondary side data with a second expected value range; and determining that a secondary side power anomaly has occurred if the secondary side data is not within the second expected value range.

17. The method of claim 11, further comprising galvanically isolating the processor from the set of primary side sensing circuits.

18. The method of claim 11, further comprising displaying a status of the LED driver on a visual display.

19. The method of claim 18, wherein the status of the LED driver is selected from a group consisting of a DMX status, a channel shorted status, a channel overload status, a channel open status, an internal fault status, a thermal fault status, a load power status, a bus voltage status, a calibration status, and a standby status.

20. The method of claim 11, further comprising:

receiving, by the processor, an input from a user from a user input device of the LED driver;

determining a status of the LED driver based on the input; and displaying the status of the LED driver on a visual display.

21. The method of claim 20, wherein the status of the LED driver is selected from a group consisting of a DMX status, a channel shorted status, a channel overload status, a channel open status, an internal fault status, a thermal fault status, a load power status, a bus voltage status, a calibration status, and a standby status.

* * * * *